US010767630B1

(12) United States Patent
Venkitanarayanan et al.

(10) Patent No.: US 10,767,630 B1
(45) Date of Patent: Sep. 8, 2020

(54) SYSTEM AND METHOD FOR OPERATING A WIND FARM DURING LOW WIND SPEEDS

(71) Applicant: General Electric Company, Schenectady, NY (US)

(72) Inventors: Vaidhya Nath Venkitanarayanan, Schenectady, NY (US); Patrick Hammel Hart, Ballston Lake, NY (US); Alina Fatima Moosvi, Ballston Spa, NY (US); Charles Joseph Kosuth, Albany, NY (US); Enno Ubben, Steinfurt (DE); Alev Akbulut, Rheine (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/423,599

(22) Filed: May 28, 2019

(51) Int. Cl.
   *F03D 7/02* (2006.01)
   *F03D 17/00* (2016.01)
   *F03D 9/10* (2016.01)
   *F03D 9/25* (2016.01)
   *F03D 7/04* (2006.01)

(52) U.S. Cl.
   CPC .............. *F03D 7/028* (2013.01); *F03D 7/04* (2013.01); *F03D 9/10* (2016.05); *F03D 9/257* (2017.02); *F03D 17/00* (2016.05); *F05B 2270/32* (2013.01)

(58) Field of Classification Search
   CPC ......... F03D 7/028; F03D 7/0284; F03D 9/257
   USPC ..................................... 290/44, 55; 700/287
   See application file for complete search history.

(56) References Cited

U.S. PATENT DOCUMENTS

| 7,166,928 | B2 * | 1/2007 | Larsen | F03D 9/257 |
| | | | | 290/55 |
| 7,372,174 | B2 * | 5/2008 | Jones | H02P 9/102 |
| | | | | 290/43 |
| 7,511,385 | B2 * | 3/2009 | Jones | H02M 5/4585 |
| | | | | 290/43 |
| 7,606,638 | B2 * | 10/2009 | Fortmann | H02J 3/1885 |
| | | | | 700/287 |
| 7,656,052 | B2 * | 2/2010 | Jones | H02M 5/4585 |
| | | | | 290/43 |
| 7,692,321 | B2 * | 4/2010 | Jones | H02M 5/4585 |
| | | | | 290/43 |

(Continued)

FOREIGN PATENT DOCUMENTS

CN        106230022 A        12/2016

*Primary Examiner* — Pedro J Cuevas
(74) *Attorney, Agent, or Firm* — Dority & Manning, P.A.

(57) ABSTRACT

A method for operating a wind farm connected to a power grid that demands a reactive power requirement that varies with active power includes monitoring a wind speed at each of the plurality of wind turbines in the wind farm. When the wind speed is within a cut-in wind speed range, the method includes determining a reactive power margin of the wind farm based on the reactive power requirement at an active power output corresponding to the wind speed and a reactive power availability of each of the plurality of wind turbines at the wind speed. The method also includes determining a lowest possible cut-in rotor speed for each of the plurality of wind turbines that satisfies the reactive power margin. Further, the method includes commanding each of the plurality of wind turbines to cut-in and begin to produce power at the lowest possible cut-in rotor speed that satisfies the reactive power margin.

20 Claims, 8 Drawing Sheets

(56) References Cited

U.S. PATENT DOCUMENTS

| | | | |
|---|---|---|---|
| 7,755,209 B2* | 7/2010 | Jones | H02M 5/4585 290/44 |
| 7,839,024 B2* | 11/2010 | Cardinal | F03D 7/0284 307/84 |
| 7,898,099 B2* | 3/2011 | Stiesdal | F03D 7/0284 290/44 |
| 8,041,465 B2* | 10/2011 | Larsen | H02J 3/16 700/287 |
| 8,049,352 B2* | 11/2011 | Jorgensen | F03D 7/0284 290/44 |
| 8,138,621 B2* | 3/2012 | Stiesdal | F03D 7/0284 290/44 |
| 8,290,634 B2* | 10/2012 | Larsen | F03D 9/257 700/287 |
| 8,355,829 B2* | 1/2013 | Arinaga | F03D 7/028 290/44 |
| 8,368,238 B2* | 2/2013 | Yasugi | F03D 7/0272 290/44 |
| 8,527,104 B2* | 9/2013 | Arinaga | H02P 23/26 700/287 |
| 8,676,392 B2* | 3/2014 | Arinaga | F03D 7/028 290/44 |
| 9,252,596 B2* | 2/2016 | Panosyan | H02J 3/1835 |
| 9,347,429 B2* | 5/2016 | Nielsen | F03D 7/0284 |
| 9,447,772 B2* | 9/2016 | Edenfeld | F03D 9/25 |
| 9,503,007 B2* | 11/2016 | Wagoner | H02P 9/007 |
| 9,588,557 B2* | 3/2017 | Wilkins | G06F 1/26 |
| 9,617,976 B2 | 4/2017 | Edenfeld | |
| 9,745,957 B2* | 8/2017 | Seymour | F03D 7/026 |
| 9,780,710 B2* | 10/2017 | Rose, Jr. | H02P 9/305 |
| 10,027,118 B2* | 7/2018 | Ubben | H02J 3/18 |
| 10,352,298 B2* | 7/2019 | Tan | H02P 9/007 |
| 10,428,797 B2* | 10/2019 | Scott | H02J 3/16 |
| 10,570,882 B2* | 2/2020 | Hardwicke, Jr. | F03D 7/0272 |
| 2006/0255594 A1* | 11/2006 | Larsen | F03D 9/257 290/44 |
| 2007/0108771 A1* | 5/2007 | Jones | H02P 9/102 290/44 |
| 2007/0121354 A1* | 5/2007 | Jones | H02P 9/102 363/47 |
| 2008/0093857 A1* | 4/2008 | Stiesdal | F03D 7/048 290/44 |
| 2008/0150283 A1* | 6/2008 | Rivas | H02J 3/46 290/44 |
| 2010/0025994 A1* | 2/2010 | Cardinal | H02J 3/383 290/44 |
| 2010/0250012 A1* | 9/2010 | Arinaga | H02J 3/386 700/287 |
| 2010/0274400 A1* | 10/2010 | Ormel | F03D 7/048 700/287 |
| 2010/0308585 A1* | 12/2010 | Jorgensen | F03D 7/048 290/44 |
| 2011/0109086 A1* | 5/2011 | Stiesdal | F03D 7/0284 290/44 |
| 2011/0112697 A1* | 5/2011 | Arinaga | F03D 7/048 700/287 |
| 2011/0156388 A1* | 6/2011 | Yasugi | F03D 7/043 290/44 |
| 2012/0136494 A1* | 5/2012 | Kirchner | H02J 3/16 700/287 |
| 2013/0093186 A1* | 4/2013 | Arinaga | H02P 23/26 290/44 |
| 2013/0168963 A1* | 7/2013 | Garcia | F03D 7/00 290/44 |
| 2013/0258732 A1* | 10/2013 | Zhu | G01R 31/42 363/95 |
| 2014/0062086 A1* | 3/2014 | Mata Dumenjo | F03D 7/00 290/44 |
| 2014/0375052 A1* | 12/2014 | Nielsen | H02J 3/386 290/44 |
| 2015/0295529 A1* | 10/2015 | Rose, Jr. | H02P 9/00 290/44 |
| 2015/0349688 A1* | 12/2015 | Wagoner | F03D 9/255 290/44 |
| 2016/0177923 A1* | 6/2016 | Edenfeld | F03D 9/25 290/44 |
| 2016/0308369 A1* | 10/2016 | Gupta | F03D 9/257 |
| 2016/0369776 A1* | 12/2016 | Edenfeld | F03D 7/048 |
| 2017/0244251 A1* | 8/2017 | Nielsen | H02J 3/18 |
| 2018/0171976 A1 | 6/2018 | Tan et al. | |
| 2019/0145376 A1* | 5/2019 | Hardwicke, Jr. | H02J 3/50 700/287 |
| 2019/0226454 A1* | 7/2019 | Bjorn | H02J 3/46 |
| 2019/0391609 A1* | 12/2019 | Kato | H02J 3/00 |
| 2020/0076193 A1* | 3/2020 | Biris | H02J 3/1842 |

\* cited by examiner

SYSTEM AND METHOD FOR OPERATING A WIND FARM DURING LOW WIND SPEEDS

FIELD

The present disclosure relates generally to wind turbines and, more particularly, to a system and method for operating a wind farm having one or more wind turbines during low wind speeds to improve efficiency.

BACKGROUND

Generally, during operation of a wind turbine, wind impacts the rotor blades and the blades transform wind energy into a mechanical rotational torque that drives a low-speed shaft. The low-speed shaft drives a gearbox that subsequently steps up the low rotational speed of the low-speed shaft to drive a high-speed shaft at an increased rotational speed, wherein the high-speed shaft rotatably drives a generator rotor. In many conventional wind turbine configurations, the generator is electrically coupled to a bi-directional power converter that includes a rotor-side converter (RSC) joined to a line-side converter (LSC) via a regulated DC link. The LSC converts the DC power on the DC link into AC output power that is combined with the power from the generator stator to provide multi-phase power having a frequency maintained substantially at the frequency of the electrical grid bus (e.g. 50 HZ or 60 HZ).

The above system is generally referred to as a doubly-fed induction generator (DFIG) system, whose operating principles include that the rotor windings are connected to the grid via slip rings and the power converter controls rotor current and voltage. Control of rotor voltage and current enables the generator to remain synchronized with the grid frequency while the wind turbine speed varies (e.g., rotor frequency can differ from the grid frequency). Also, the primary source of reactive power from the DFIG system is from the RSC via the generator (generator stator-side reactive power) and the LSC (generator line-side reactive power). Use of the power converter, in particular the RSC, to control the rotor current/voltage makes it is possible to adjust the reactive power (and real power) fed to the grid from the RSC independently of the rotational speed of the generator. In addition, the generator is able to import or export reactive power, which allows the system to support the grid during extreme voltage fluctuations on the grid.

Typically, the amount of reactive power to be supplied by a wind farm to the grid during steady-state and transient states is established by a code requirement dictated by the grid operator, wherein a wind farm controller determines the reactive power demand made on each wind turbine within the wind farm. A local controller at each wind turbine receives and allocates the reactive power demand between the generator sources (e.g., between generator-side reactive power and line-side reactive power).

In general, the minimum speed (i.e. the cut-in speed) of the DFIG is decided based on the voltage limit imposed by the RSC (also referred to herein as the rotor voltage). Lowering or extending the minimum speed of the turbine increases the operating slip of the DFIG, which mandates the RSC to operate at a higher voltage. Therefore, the upper limit on the rotor voltage often determines the lowest possible rotor cut-in speed.

In addition to the minimum turbine speed, the reactive power requirement from the DFIG also effects the voltage at the terminals of the RSC. Further, as mentioned, most of the grid codes demand rated reactive power support during the entire operation of the wind turbine, i.e. from cut-in speed to rated speed. Providing the rated reactive power at the minimum turbine speed further forces the RSC to operate at a higher voltage.

One method of decreasing rotor voltage is to decrease the amount of over-excited (or capacitive) reactive power and, if possible, to increase the amount of under-excited (or inductive) reactive power produced by the generator. Further, most grid codes permit wind farms to produce less than full-load reactive power when the wind speeds are close to cut-in wind speed. For example, the Electric Reliability Council of Texas (ERCOT) generally allows for zero reactive power capability when the farm is operating below 10% of its rated power output. In contrast, the Federal Energy Regulatory Commission (FERC) requirements for the rest of the U.S. require reactive power capability only in proportion to the active power being produced by the wind farm.

Thus, an improved system and method for operating a wind turbine power system during low wind speeds to take advantage of the relaxation of the reactive power requirements at low wind speeds would be welcomed in the art. Accordingly, the present disclosure is directed to a system and method for operating a wind turbine power system during low wind speeds, but which also meet reactive requirements set by the grid codes that that level of power output.

BRIEF DESCRIPTION

Aspects and advantages of the invention will be set forth in part in the following description, or may be obvious from the description, or may be learned through practice of the invention.

In one aspect, the present disclosure is directed to a method for operating a wind farm connected to a power grid that demands a reactive power requirement that varies with active power. The wind farm has a plurality of wind turbines each including a generator coupled to a power converter. The method includes monitoring a wind speed at each of the plurality of wind turbines in the wind farm. When the wind speed is within a cut-in wind speed range, the method includes determining, via a controller of the wind farm, a reactive power margin of the wind farm based on the reactive power requirement at an active power output corresponding to the wind speed and a reactive power availability of each of the plurality of wind turbines at the wind speed. The method also includes determining, via the controller, a lowest possible cut-in rotor speed for each of the plurality of wind turbines that satisfies the reactive power margin. Further, the method includes commanding, via the controller, each of the plurality of wind turbines to cut-in and begin to produce power at the lowest possible cut-in rotor speed that satisfies the reactive power margin.

In an embodiment, the cut-in wind speed range may include wind speeds up to about 5 meters/second (m/s).

In one embodiment, determining the reactive power margin of the wind farm based on the reactive power requirement at the active power output corresponding to the wind speed and the reactive power availability of each of the plurality of wind turbines at the wind speed may include determining a difference between the reactive power requirement and a sum of the reactive power availability of each of the plurality of wind turbines and determining the lowest possible cut-in rotor speed for each of the plurality of wind turbines based on the difference.

In another embodiment, the method may further include storing the reactive power availability of each of the plurality of wind turbines at different cut-in wind speeds in the controller. In addition or alternatively, the method may include dynamically sending, via each of the plurality of wind turbines, the reactive power availability of each of the plurality of wind turbines at different cut-in wind speeds in real-time to the controller.

In several embodiments, the method may include determining the lowest possible cut-in rotor speed for each of the plurality of wind turbines that satisfies the reactive power margin real-time.

In additional embodiments, when the active power output has increased beyond about 10% of rated power, the method may include operating each of the plurality of wind turbines in the wind farm according to its respective standard power-speed curve.

In yet another embodiment, during a training period of the wind farm, the method may include operating, via the controller, the wind farm at different reactive power set points and voltage set points. Further, the method may include determining, via the controller, a voltage drop and a change in the reactive power between terminals of each the plurality of wind turbines and a point of interconnection of the wind farm. Further, the method may include translating, via the controller, the voltage drop and the change in the reactive power between terminals of each the plurality of wind turbines and the point of interconnection of the wind farm to quantities that can be compared to an equivalent circuit of a collector system of the wind farm. Moreover, the method may include matching, via the controller, the quantities to the equivalent circuit of the collector system of the wind farm.

In alternative embodiments, during a training period of the wind farm, the method may include calculating, via the controller, quantities of a voltage drop and a change in the reactive power between terminals of each the plurality of wind turbines and a point of interconnection of the wind farm. The method may also include matching, via the controller, the quantities to an equivalent circuit of the collector system of the wind farm.

In yet another embodiment, during a training period of the wind farm, the method may includes storing, in the controller, quantities of a voltage drop and a change in the reactive power between terminals of each the plurality of wind turbines and a point of interconnection of the wind farm in a look-up table and matching, via the controller, the quantities to an equivalent circuit of the collector system of the wind farm.

In particular embodiments, the generator may be a doubly fed induction generator (DFIG).

In another aspect, the present disclosure is directed to a wind farm connected to a power grid. The wind farm includes a plurality of wind turbines each including a generator coupled to a power converter and a turbine controller and a controller communicatively coupled to the turbine controllers. The controller is configured for performing a plurality of operations, including but not limited to monitoring an active power output of the wind farm, and when the active power output is equal to or below a power threshold, calculating a reactive power requirement of the wind farm based on the power output and an active power-reactive power (P-Q) curve specified by the power grid, calculating a reactive power availability at a point of interconnection of the wind farm, comparing the reactive power availability and the reactive power requirement, and allowing one or more of the plurality of wind turbines of the wind farm to cut-in and begin to produce power at a lowest possible cut-in rotor speed when the reactive power availability is greater than the reactive power requirement.

In an embodiment, the plurality of operations may further include determining whether all of the wind turbines with wind speeds above a cut-in wind speed have cut-in and if so, determining whether a power coefficient of any one of the plurality of wind turbines will improve with a step decrease in rotor speed. In another embodiment, if the power coefficient of any one of the plurality of wind turbines will improve with the step decrease in rotor speed, the plurality of operations may also include commanding those wind turbines to reduce their speed.

In one embodiment, the plurality of operations may include determining whether all of the wind turbines with wind speeds above a cut-in wind speed have cut-in and if not, allowing at least one additional wind turbine from the plurality of wind turbines to cut-in at the lowest possible cut-in rotor speed.

In further embodiments, the plurality of operations may include prohibiting the plurality of wind turbines from cutting-in at the lowest possible cut-in rotor speed when the power output is above the power threshold.

In yet another embodiment, the power threshold may be equal to or lower than 10% of rated power.

In another embodiment, when the active power output has increased beyond the power threshold, the plurality of operations may include operating the wind farm according to a standard power curve.

It should be understood that the methods and wind farms may further include any combination of the additional features and/or steps as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
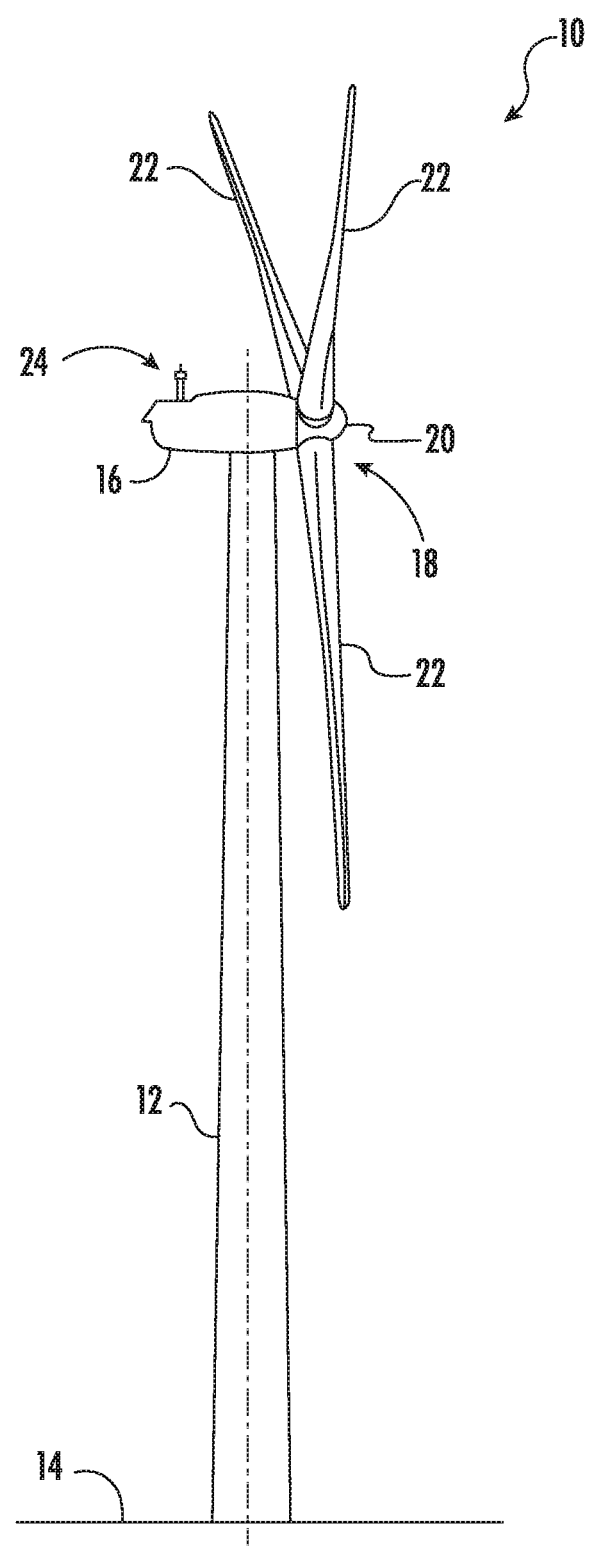
FIG. 1 illustrates a perspective view of an embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

The minimum cut-in rotor speed of wind turbines is generally determined to be the speed at which the wind turbine can make active power while also being able to make/absorb full reactive power over a specified range of terminal voltage, such as maximum voltage. The requirement to make full over-excited (or capacitive) reactive power at the high end of the terminal voltage defines the maximum for rotor voltage and hence the minimum for the cut-in rotor speed. This results in a very high RPM for cut-in which results in poor power coefficients ($C_p$) at low wind speeds.

Most grid codes specify reactive power requirements at the point of interconnection (POI) of a wind farm having a plurality of wind turbines. Thus, the present disclosure is directed to a system and method that can predict the reactive power and voltage drops between the turbine terminals and the POI in real-time to allow the wind turbines to cut in and stay at the lowest rotor speeds (e.g. RPMs) that allows enough margin for reactive power to meet the requirement at the POI for the grid code.

Accordingly, the present disclosure is directed to a system and method for operating a wind farm connected to a power grid that demands a reactive power requirement that varies with active power. More specifically, systems and methods of the present disclosure include determining the rotor speed (e.g. in RPM) at which the individual wind turbines will cut in and being generating active power. The cut-in RPM will be the minimum RPM at which the wind turbine along with all other wind turbines that are already online, will have enough reactive power margin immediately after cut-in to meet the reactive power/voltage requirements at the point of interconnection (POI) of the wind farm.

After cut-in, during low power output, systems and methods of the present disclosure are also configured to ensure that the wind turbines are operating at an RPM sufficient to produce enough reactive power to meet the wind farm requirements. The present disclosure accomplishes this goal by setting an RPM lower limit based on reactive power availability. Typically, when the wind turbines are producing greater than roughly 10% of their power output, the rotational speed is naturally high enough to ensure that rotor voltage is no longer the limiting factor in producing reactive power. Beyond this point, the present disclosure can relinquish or disable this aspect of its control.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, as will be described below, the rotor 18 may be rotatably coupled to an electric generator 120 (FIG. 2) for production of electrical energy. One or more wind conditions, such as wind speed and/or wind direction may also be monitored via a wind sensor 24, such as an anemometer, located on the nacelle 16 or any other suitable location near the wind turbine 10.

Wind power generation is typically provided by a wind farm having a large number (often 100 or more) of the wind turbines 10 with associated wind turbine generators 120 (FIG. 2), wherein each individual wind turbine 10 typically experiences a unique wind force. Accordingly, the output power for each individual wind turbine generator 120 may vary from one wind turbine 10 to another wind turbine 10 within the wind farm.

As is generally understood, active power and reactive power are provided by each wind turbine generator 120. In some embodiments, a farm-level controller provides reactive power commands ($Q_{cmd}$) to the wind turbine generators 120, based on transmission grid needs (which may be dictated by the grid operator or determined based on grid voltage). The reactive power demand may be identical for each wind turbine generator. In an alternate control methodology, the reactive power commands may be individually tailored to the wind turbine generators 120 in the wind farm based on the different power generation characteristics of the respective wind turbine generators 120. It should be appreciated that the present invention is not limited to the manner or methodology in which the reactive power command for an individual wind turbine generator 120 is generated.

Figure 2:
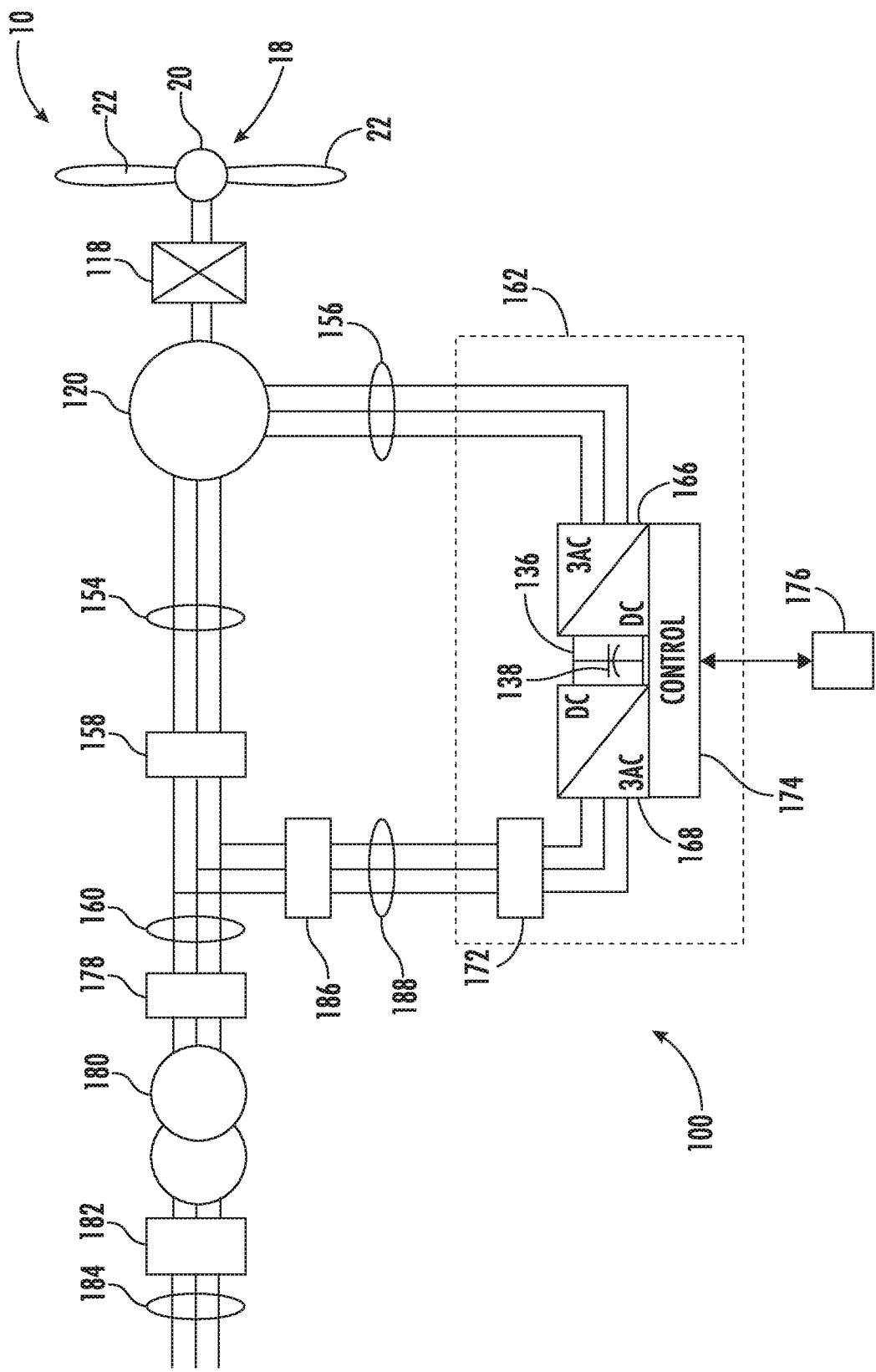
FIG. 2 illustrates a schematic view of one embodiment of a wind turbine electrical power system suitable for use with the wind turbine shown in FIG. 1.

Referring now to FIG. 2, a schematic diagram of one embodiment of a wind turbine DFIG power system 100 ("wind turbine system") is illustrated in accordance with aspects of the present disclosure. Although the present disclosure will generally be described herein with reference to the system 100 shown in FIG. 2, those of ordinary skill in the art, using the disclosures provided herein, should understand that aspects of the present disclosure may also be applicable in other power generation systems, and, as mentioned above, that the invention is not limited to wind turbine systems.

In the embodiment of FIG. 2, the rotor 18 of the wind turbine 10 (FIG. 1) may, optionally, be coupled to a gearbox 118, which is, in turn, coupled to the generator 120, which may be a doubly fed induction generator (DFIG). As shown, the DFIG 120 may be connected to a stator bus 154. Further, as shown, a power converter 162 may be connected to the DFIG 120 via a rotor bus 156, and to the stator bus 154 via a line side bus 188. As such, the stator bus 154 may provide an output multiphase power (e.g. three-phase power) from a stator of the DFIG 120, and the rotor bus 156 may provide an output multiphase power (e.g. three-phase power) from a rotor of the DFIG 120. The power converter 162 may also include a rotor side converter (RSC) 166 and a line side converter (LSC) 168. The DFIG 120 is coupled via the rotor bus 156 to the rotor side converter 166. Additionally, the RSC 166 is coupled to the LSC 168 via a DC link 136 across which is a DC link capacitor 138. The LSC 168 is, in turn, coupled to a line side bus 188.

The RSC 166 and the LSC 168 may be configured for normal operating mode in a three-phase, pulse width modulation (PWM) arrangement using insulated gate bipolar transistor (IGBT) switching elements, as will be discussed in more detail with respect to FIG. 3.

In addition, the power converter 162 may be coupled to a controller 174 in order to control the operation of the rotor side converter 166 and the line side converter 168. It should be noted that the converter controller 174 may be configured as an interface between the power converter 162 and a local wind turbine control system 176 and may include any number of control devices. In one embodiment, the controller 174 may include a processing device (e.g. microprocessor, microcontroller, etc.) executing computer-readable instructions stored in a computer-readable medium. The instructions when executed by the processing device may cause the processing device to perform operations, including providing control commands (e.g. switching frequency commands) to the switching elements of the power converter 162.

In typical configurations, various line contactors and circuit breakers including, for example, a grid breaker 182 may also be included for isolating the various components as necessary for normal operation of the DFIG 120 during connection to and disconnection from a load, such as the electrical grid 184. For example, a system circuit breaker 178 may couple the system bus 160 to a transformer 180, which may be coupled to the electrical grid 184 via the grid breaker 182. In alternative embodiments, fuses may replace some or all of the circuit breakers.

In operation, alternating current power generated at the DFIG 120 by rotating the rotor 18 is provided to the electrical grid 184 via dual paths defined by the stator bus 154 and the rotor bus 156. On the rotor bus side 156, sinusoidal multi-phase (e.g. three-phase) alternating current (AC) power is provided to the power converter 162. The rotor side power converter 166 converts the AC power provided from the rotor bus 156 into direct current (DC) power and provides the DC power to the DC link 136. As is generally understood, switching elements (e.g. IGBTs) used in the bridge circuits of the rotor side power converter 166 may be modulated to convert the AC power provided from the rotor bus 156 into DC power suitable for the DC link 136.

In addition, the LSC 168 converts the DC power on the DC link 136 into AC output power suitable for the electrical grid 184. In particular, switching elements (e.g. IGBTs) used in bridge circuits of the LSC 168 can be modulated to convert the DC power on the DC link 136 into AC power on the line side bus 188. The AC power from the power converter 162 can be combined with the power from the stator of DFIG 120 to provide multi-phase power (e.g. three-phase power) having a frequency maintained substantially at the frequency of the electrical grid 184 (e.g. 50 Hz or 60 Hz). In certain instances, as mentioned, for an individual DFIG wind turbine power system 100, the reactive power may be supplied primarily by the RSC 166, via the generator 120 and the LSC 168.

Additionally, various circuit breakers and switches, such as grid breaker 182, system breaker 178, stator sync switch 158, converter breaker 186, and line contactor 172 may be included in the wind turbine power system 100 to connect or disconnect corresponding buses, for example, when current flow is excessive and may damage components of the wind turbine power system 100 or for other operational considerations. Additional protection components may also be included in the wind turbine power system 100.

Moreover, the power converter 162 may receive control signals from, for instance, the local control system 176 (also referred to herein as a turbine controller) via the converter controller 174. The control signals may be based, among other things, on sensed states or operating characteristics of the wind turbine power system 100. Typically, the control signals provide for control of the operation of the power converter 162. For example, feedback in the form of a sensed speed of the DFIG 120 may be used to control the conversion of the output power from the rotor bus 156 to maintain a proper and balanced multi-phase (e.g. three-phase) power supply. Other feedback from other sensors may also be used by the controller 174 or control system 176 to control the power converter 162, including, for example, stator and rotor bus voltages and current feedbacks. Using the various forms of feedback information, switching control signals (e.g. gate timing commands for IGBTs), stator synchronizing control signals, and circuit breaker signals may be generated.

The power converter 162 also compensates or adjusts the frequency of the three-phase power from the rotor for changes, for example, in the wind speed at the hub 20 and the blades 22. Therefore, mechanical and electrical rotor frequencies are decoupled and the electrical stator and rotor frequency matching is facilitated substantially independently of the mechanical rotor speed.

Under some states, the bi-directional characteristics of the power converter 162, and specifically, the bi-directional characteristics of the LSC 168 and RSC 166, facilitate feeding back at least some of the generated electrical power into generator rotor 120. More specifically, electrical power may be transmitted from the stator bus 154 to the line side bus 188 and subsequently through the line contactor 172 and into the power converter 162, specifically the LSC 168 which acts as a rectifier and rectifies the sinusoidal, three-phase AC power to DC power. The DC power is transmitted into the DC link 136. The capacitor 138 facilitates mitigating DC link voltage amplitude variations by facilitating mitigation of a DC ripple sometimes associated with three-phase AC rectification.

The DC power is subsequently transmitted to the RSC 166 that converts the DC electrical power to a three-phase, sinusoidal AC electrical power by adjusting voltages, currents, and frequencies. This conversion is monitored and controlled via the converter controller 174. The converted AC power is transmitted from the RSC 166 via the rotor bus 156 to the generator rotor. In this manner, generator reactive power control is facilitated by controlling rotor current and voltage.

Figure 3:
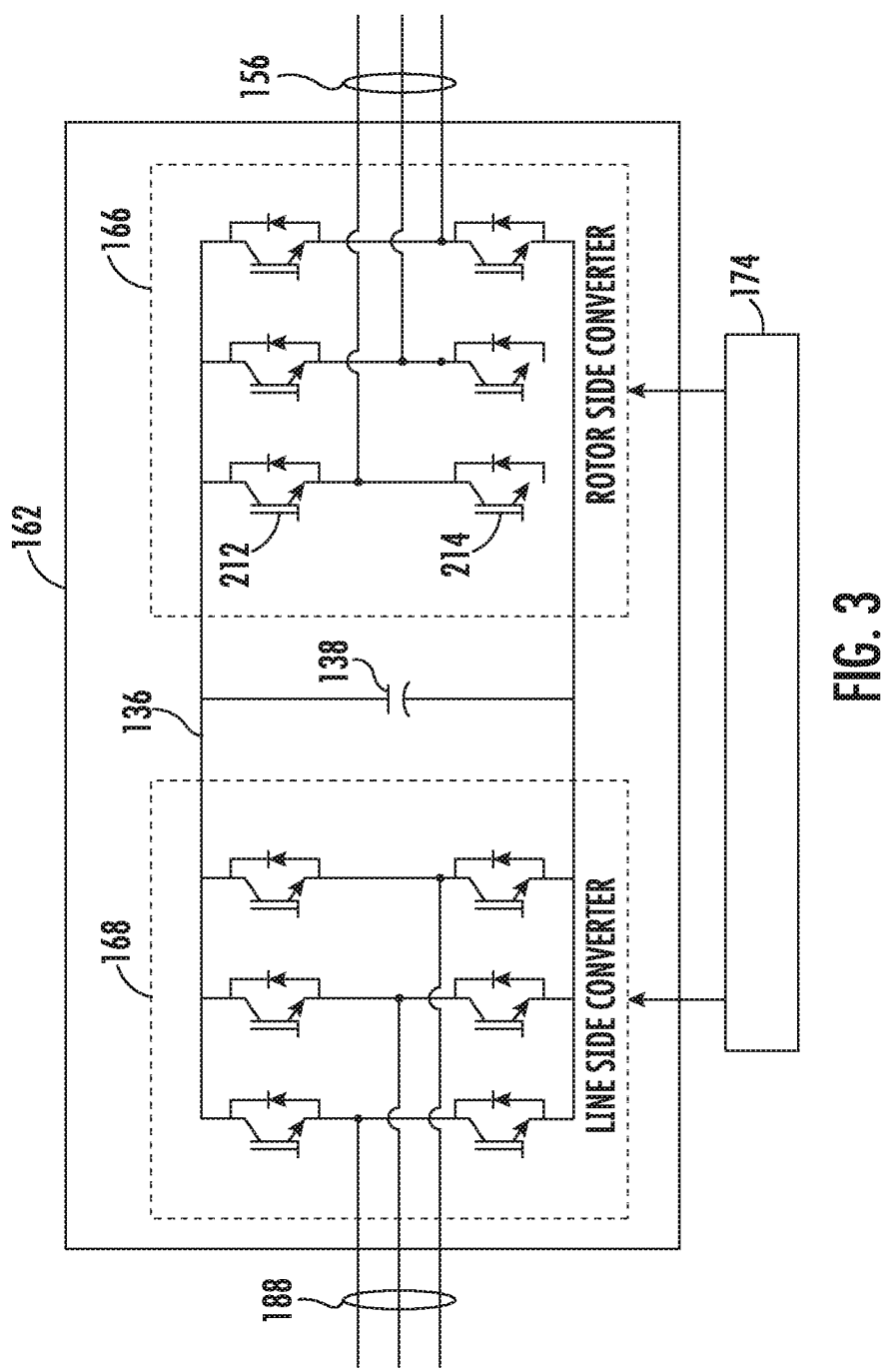
FIG. 3 illustrates a schematic diagram of one embodiment of a power converter of a wind turbine according to the present disclosure.

Referring now to FIG. 3, a detailed, schematic diagram of one embodiment of the power converter 162 shown in FIG. 2 is illustrated in accordance with aspects of the present disclosure. As shown, the RSC 166 includes a plurality of bridge circuits (e.g. H-bridge circuits), with each phase of the rotor bus 156 input to the rotor side converter 166 being coupled to a single bridge circuit. In addition, the LSC 168 may also include a plurality of bridge circuits. Similar to the rotor side converter 166, the line side converter 168 also includes a single bridge circuit for each output phase of the line side converter 168. In other embodiments, the line side converter 168, the rotor side converter 166, or both the line side converter 168 and the rotor side converter 166 may include parallel bridge circuits without deviating from the scope of the present disclosure.

Each bridge circuit may generally include a plurality of switching elements (e.g. IGBTs) coupled in series with one another. For instance, as shown in FIG. 3, each bridge circuit includes an upper IGBT (e.g. IGBT 212) and a lower IGBT (e.g. IGBT 214). In addition, a diode may be coupled in parallel with each of the IGBTs. In alternative embodiments, parallel IGBTs and diodes may be used to increase the current rating of the converter. As is generally understood, the line side converter 168 and the rotor side converter 166 may be controlled, for instance, by providing control commands, using a suitable driver circuit, to the gates of the IGBTs. For example, the converter controller 174 may provide suitable gate timing commands to the gates of the IGBTs of the bridge circuits. The control commands may control the switching frequency of the IGBTs to provide a desired output. It should be appreciated by those of ordinary skill in the art that, as an alternative to IGBTs, the power convertor 162 may include any other suitable switching elements.

Figure 4:
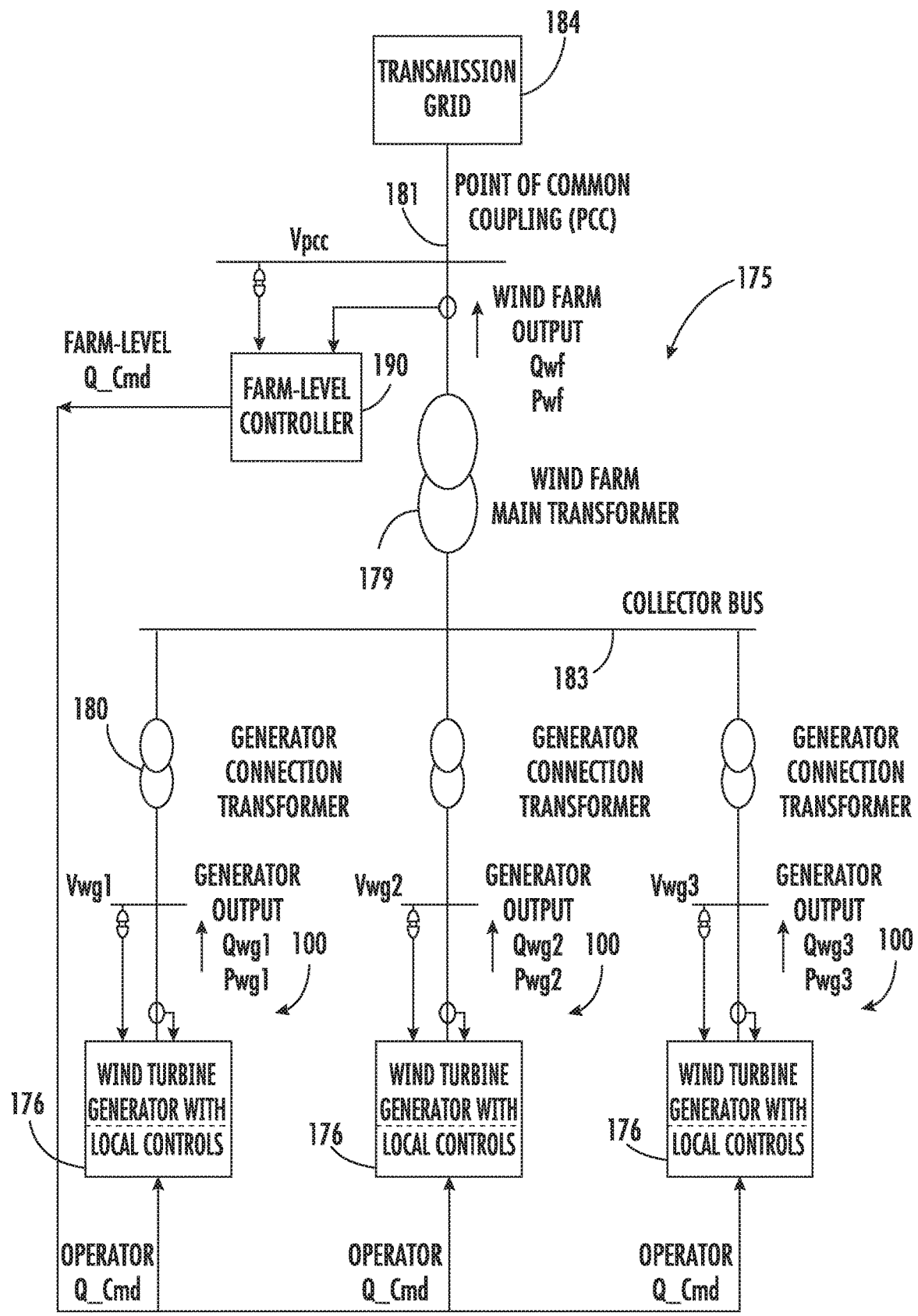
FIG. 4 illustrates a system configuration of one embodiment of a wind farm according to the present disclosure.

Referring generally to FIG. 4, a block diagram of a wind farm 175 having multiple wind turbine systems 100 coupled with a transmission grid 184 (also referred to herein as a power grid) is illustrated. For example, as shown, each wind turbine system 100 may include a local turbine controller 176 that is responsive to the states of the wind turbine generator being controlled. In one embodiment, the local controller 176 senses only the terminal voltage and current (via potential and current transformers), which are used by the local controller 176 to provide an appropriate response to cause the wind turbine generator 120 to provide the desired reactive power or power factor and voltage.

Each wind turbine system 100 may be coupled to collector bus 183 through a generator connection transformer 180 to provide real and reactive power (labeled $P_{wg}$ and $Q_{wg}$, respectively) to the collector bus 183. Generator connection transformers and collector buses are known in the art.

The wind farm 175 provides farm-level real and reactive power output (labeled $P_{wf}$ and $Q_{wf}$, respectively) via wind farm main transformer 179. A farm-level controller 190 senses the wind farm output as well as the voltage at a point of common coupling 181 (also referred to herein as point of interconnection) with the grid 184 to provide a farm-level reactive power command (Farm-Level Q_Cmd).

A local reactive power command (Operator Q_Cmd) is generated and transmitted to each individual wind turbine system 100 in the wind farm 175. In one embodiment, the total reactive power demand ($Q_{wf}$) placed on the wind farm 175 may be essentially equally divided between the wind turbine systems 100 such that the local Operator Q_Cmd command is the same for all of the wind turbine systems 100. In an alternate embodiment, the local Operator Q_Cmd command may be based on an available reactive power value for that wind turbine generator 120. For example, individual wind turbine generators 120 that are providing relatively more real power ($P_{wg}$) may receive relatively smaller individualized Operator Q_Cmd commands, and individual wind turbine generators 120 that are providing relatively less real power Pwg may receive relatively larger individualized Operator Q_Cmd commands. This reduces curtailment of individual wind turbine generators 120 that are providing relatively more real power, thus increasing the real power ($P_{wf}$) produced by the wind farm 175 relative to increased farm level reactive power commands ($Q_{wf}$).

It should be appreciated that the converter controllers 174, local wind turbine controllers 176, and farm-level controller 190 may each correspond to any suitable computing device and/or any combination of computing devices. For instance, a controller may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller to perform various functions, such as the steps disclosed herein.

Figure 5:
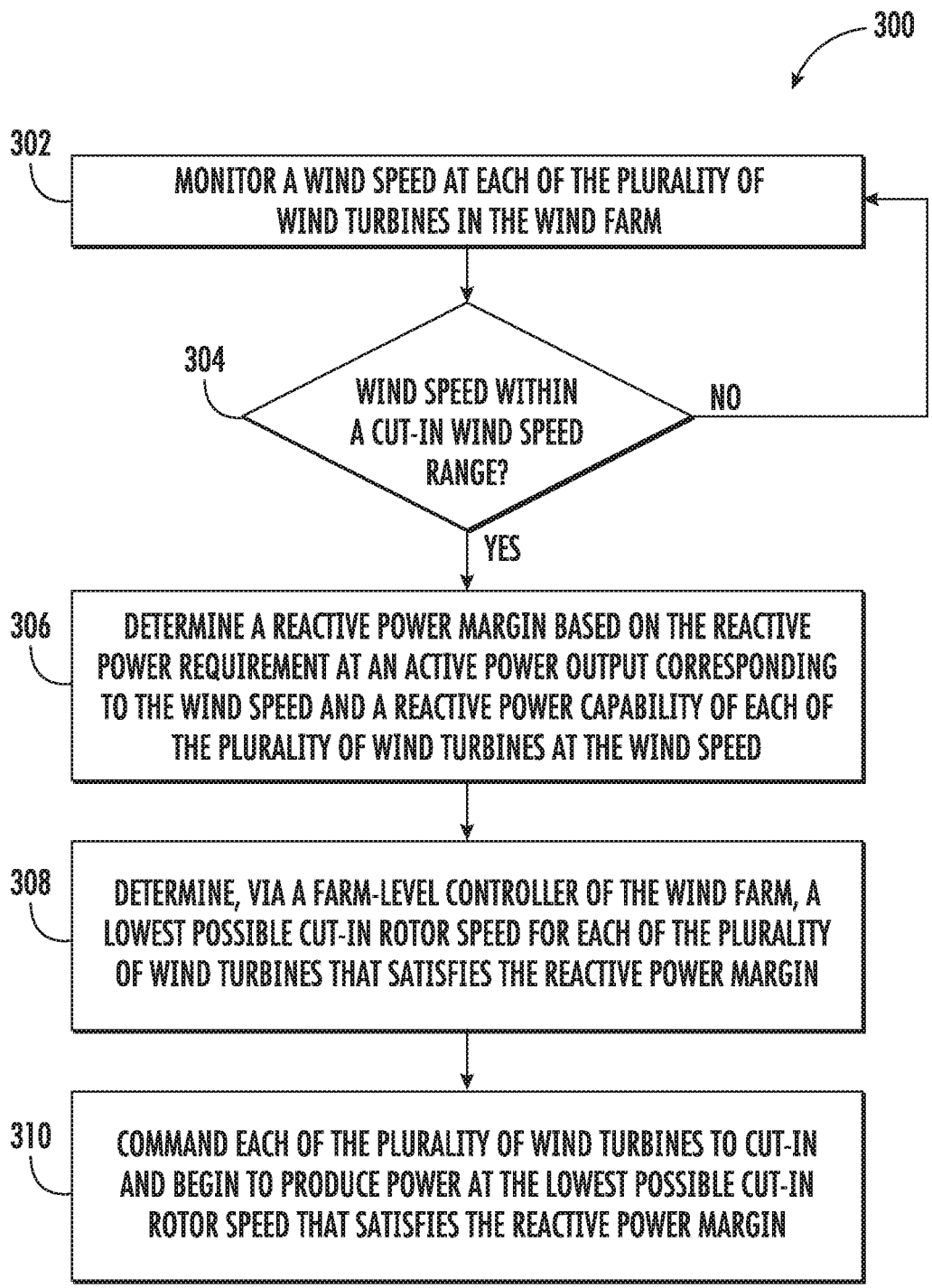
FIG. 5 illustrates a flow diagram of one embodiment of a method for operating a wind farm connected to a power grid that demands a reactive power requirement that varies with active power output according to the present disclosure.

Referring now to FIG. 5, a flow diagram of an embodiment of a method 300 for operating a wind farm connected to a power grid that demands a reactive power requirement that varies with active power is illustrated in accordance with aspects of the present disclosure. In general, the method 300 is described herein as implemented using, for example, the wind turbine power system 100 described above. However, it should be appreciated that the disclosed method 300 may be implemented using any other suitable wind power generation system that is configured to supply power, including reactive power, for application to a load, such as a power grid. In addition, although FIG. 5 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown at (302), the method 300 includes monitoring a wind speed at each of the plurality of wind turbines in the wind farm 175. As shown at (304), the method 300 includes determining whether the wind speed is within a cut-in wind speed range. More specifically, in an embodiment, the cut-in wind speed range may include wind speeds up to about 5 meters/second (m/s). In general, however, the cut-in wind speed or the cut-in wind speed range generally refers to the wind speeds that allow the wind turbine to begin to generate active power.

If the wind speed is within the cut-in wind speed range, as shown at (306), the method 300 includes determining, e.g. via the farm-level controller 190 of the wind farm 175, a reactive power margin of the wind farm 175 based on the reactive power requirement at an active power output corresponding to the wind speed and a reactive power availability of each of the plurality of wind turbines at the wind speed.

Thus, as shown at (308), the method 300 includes determining, via the farm-level controller 190, a lowest possible cut-in rotor speed for each of the plurality of wind turbines that satisfies the reactive power margin. In one embodiment, for example, the farm-level controller 190 may determine the lowest possible cut-in rotor speed by determining a difference between the reactive power requirement and a sum of the reactive power availability of each of the plurality of wind turbines and determining the lowest possible cut-in rotor speed for each of the plurality of wind turbines based on the difference. More specifically, in one embodiment, the farm-level controller 190 may be configured to monitor the difference between the reactive power requirement and the reactive power availability in real-time.

In another embodiment, the farm-level controller 190 may store the reactive power availability of each of the plurality of wind turbines at different cut-in wind speeds in the farm-level controller 190. In an alternative embodiment, the farm-level controller 190 may dynamically receive the reactive power availability of each of the plurality of wind turbines in real-time from each of the plurality of wind turbines.

Still referring to FIG. 5, as shown at (310), the method 300 also includes commanding, via the farm-level controller, each of the plurality of wind turbines to cut-in and begin to produce power at the lowest possible cut-in rotor speed that satisfies the reactive power margin. In one embodiment, the farm-level controller 190 may also command the wind turbines in real-time to change their rotor speed (RPM) as required.

Generally, if the wind speed continues to increase after the cut-in wind speed range (and thus the active power output for the wind farm 175 increases beyond about 10% of rated power), it is expected that the rotor speeds of the wind turbines have naturally increased to the point where rotor voltage is no longer the limit. Thus, beyond this point, the farm-level controller 190 can relinquish this aspect of control and allow the wind turbines of the wind farm 175 to follow their standard power-speed curves.

Figure 6:
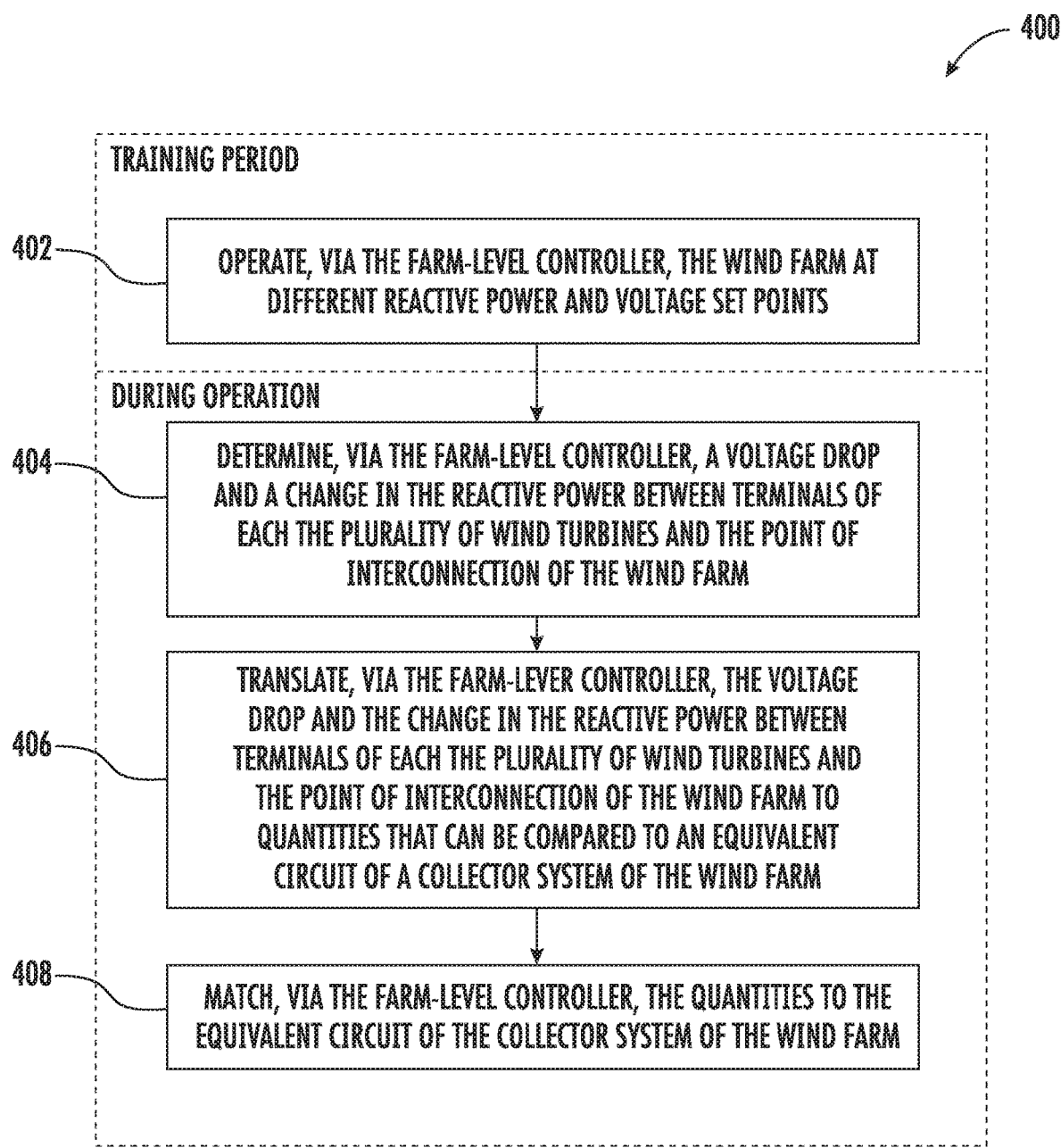
FIG. 6 illustrates a flow diagram of one embodiment of a method for matching the reactive power requirements at the point of interconnection of the wind farm to the reactive power availability at the turbine terminals according to the present disclosure.

Referring now to FIG. 6, a flow diagram of an embodiment of a method 400 for matching the reactive power requirements at the point of interconnection 181 of the wind farm 175 to the reactive power availability at the turbine terminals is illustrated in accordance with aspects of the present disclosure. The conventional approach for matching the reactive power requirements at the point of interconnection to the reactive power availability at the turbine terminals would be to mathematically translate the reactive power availability from the turbine terminals to the point of interconnection though the equivalent circuit of the collector system. However, in practice, it is difficult to acquire the equivalent circuit of the collector system. Therefore, the method 400 of FIG. 6 provides a "train and learn" approach.

In general, the method 400 is described herein as implemented using, for example, the wind turbine power system 100 described above. However, it should be appreciated that the disclosed method 400 may be implemented using any other suitable power generation system that is configured to supply power, including reactive power, for application to a load, such as a power grid. In addition, although FIG. 6 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown at (402), during a training or commissioning period of the wind farm 175, the method 400 may include operating, via the farm-level controller 190, the wind farm 175 at different reactive power and voltage set points for a low range of wind speeds. As shown at (404), during operation of the wind farm 175, the method 400 may include determining or recording, via the farm-level controller 190, a voltage drop and a change (e.g. a loss or gain) in the reactive power between terminals of each the plurality of wind turbines and the point of interconnection 181 of the wind farm 175.

Further, as shown at (406), the method 400 may include translating, via the farm-level controller 190, the voltage drop and the change in the reactive power between terminals of each the plurality of wind turbines and the point of interconnection 181 of the wind farm 175 to quantities that can be compared to the equivalent circuit of a collector system of the wind farm 175 (i.e. the same point in the system). In other words, as shown at (408), the method 400 may include matching, via the farm-level controller 190, the quantities to the equivalent circuit of the collector system of the wind farm 175.

In alternative embodiments, the farm-level controller 190 can be programmed to calculate the parameters of the equivalent circuit of the collector system of the wind farm 175 with a relatively limited amount of training.

Figure 7:
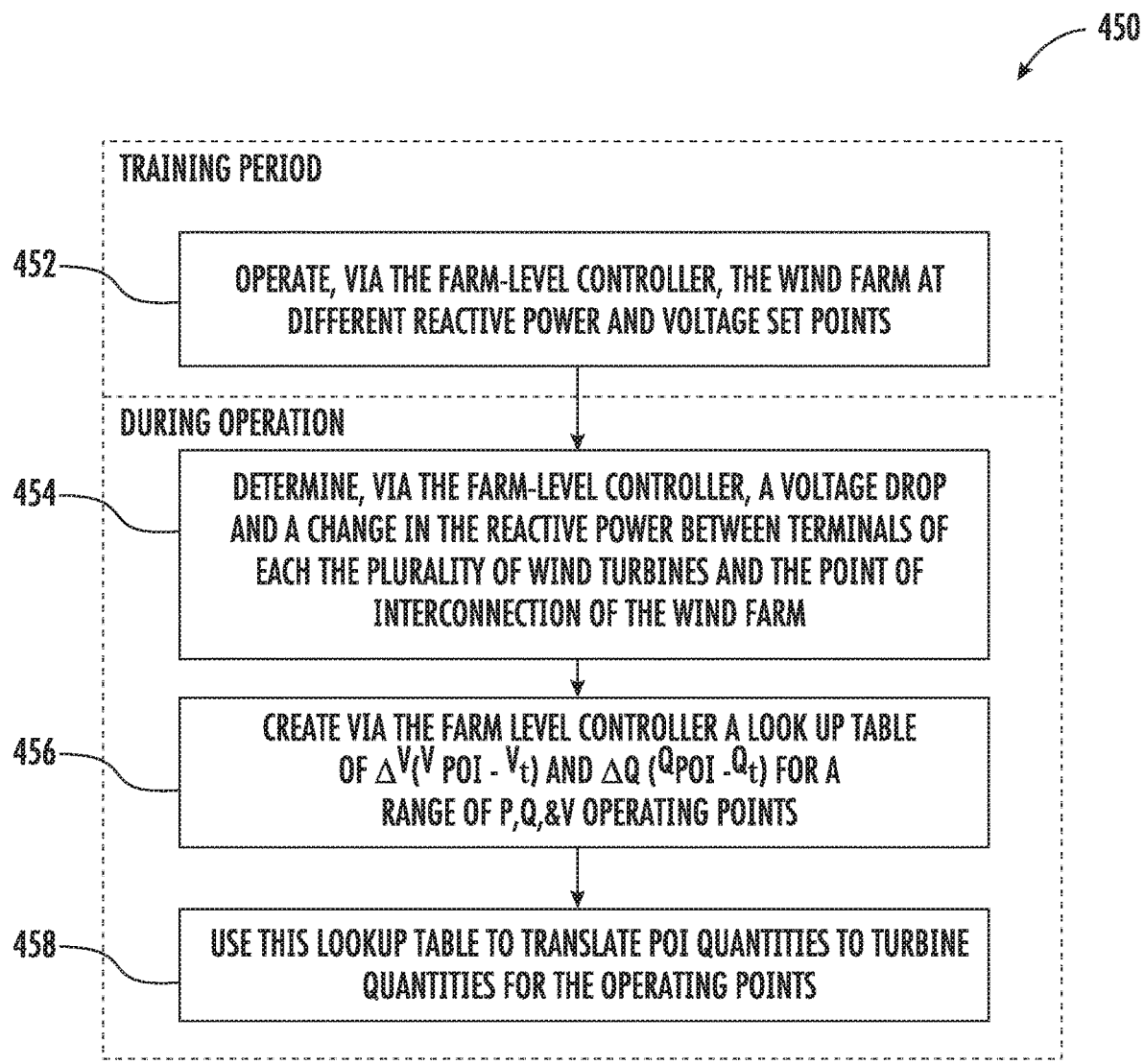
FIG. 7 illustrates a flow diagram of another embodiment of a method for matching the reactive power requirements at the point of interconnection of the wind farm to the reactive power availability at the turbine terminals according to the present disclosure.

In an alternative embodiment, as shown in FIG. 7, a flow diagram of another embodiment of a method 450 for matching the reactive power requirements at the point of interconnection 181 of the wind farm 175 to the reactive power availability at the turbine terminals is illustrated in accordance with aspects of the present disclosure. In general, method 450 is described herein as implemented using, for example, the wind turbine power system 100 described above. However, it should be appreciated that the disclosed method 450 may be implemented using any other suitable power generation system that is configured to supply power, including reactive power, for application to a load, such as a power grid. In addition, although FIG. 7 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown at (452), during a training or commissioning period of the wind farm 175, the method 450 may include operating, via the farm-level controller 190, the wind farm 175 at different reactive power and voltage set points for a low range of wind speeds. As shown at (454), during operation of the wind farm 175, the method 450 may include determining or recording, via the farm-level controller 190, a voltage drop and a change (e.g. a loss or gain) in the reactive power between terminals of each the plurality of wind turbines and the point of interconnection 181 of the wind farm 175.

Further, as shown at (456), the farm-level controller 190 can create a look-up table of $\Delta V$ ($V_{poi}-V_{term}$) and $\Delta Q$ ($Q_{poi}-Q_{term}$) for different operating conditions of the wind farm 175 (e.g. for a range of P, Q, and V operating points). Moreover, as shown at (458), the farm-level controller 190 can then use the look-up table of $\Delta V$ and $\Delta Q$ values directly to translate POI quantities to turbine quantities for the operating point (e.g. without having to fit it into the R, X and B parameters of a collector system).

Figure 8:
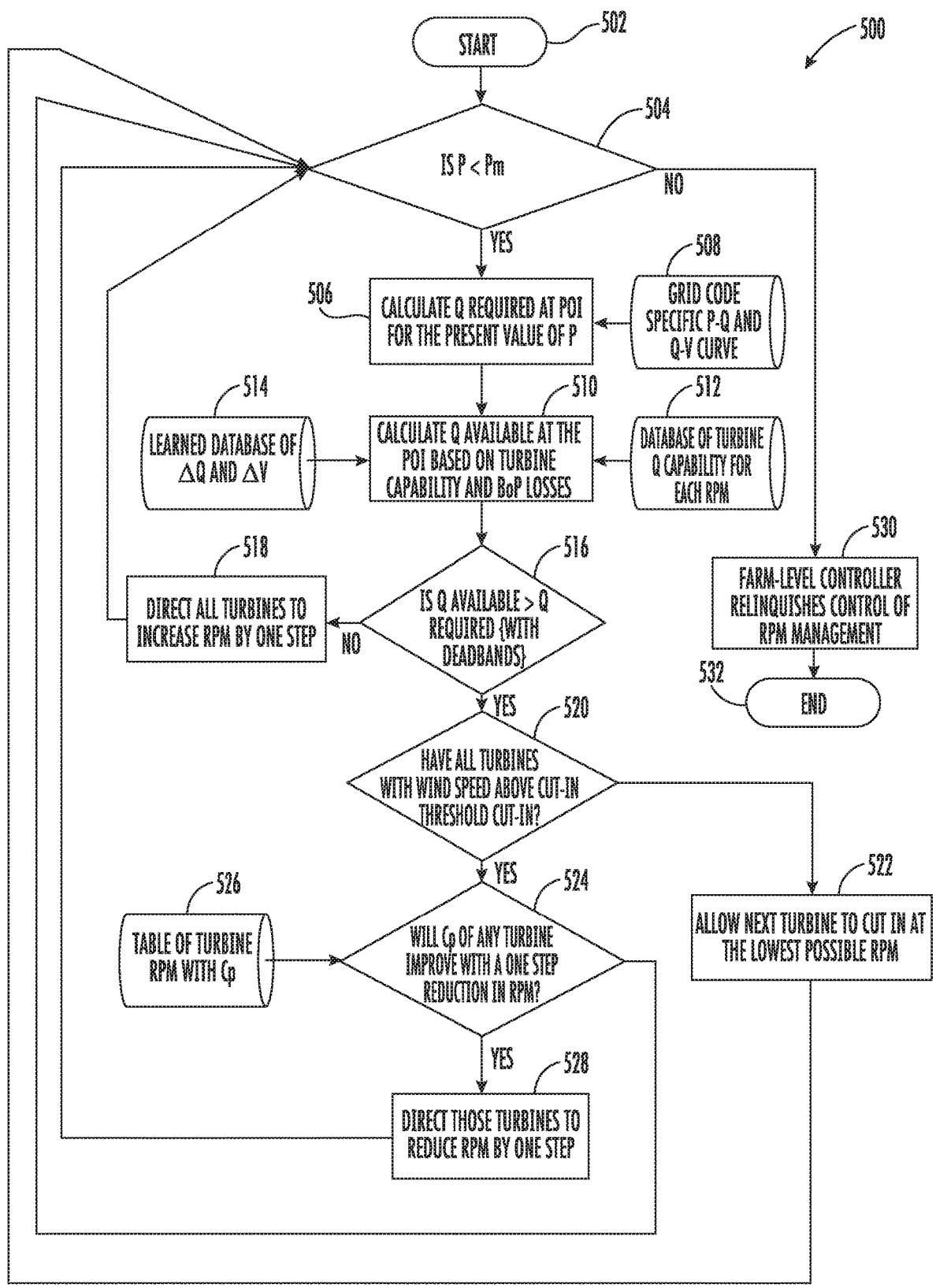
FIG. 8 illustrates a flow diagram of another embodiment of a method for operating a wind farm connected to a power grid that demands a reactive power requirement that varies with active power according to the present disclosure.

Referring now to FIG. 8, a flow diagram of another embodiment of a method 500 for operating a wind farm connected to a power grid that demands a reactive power requirement that varies with active power is illustrated in accordance with aspects of the present disclosure. In general, the method 500 is described herein as implemented using, for example, the wind turbine power system 100 described above. However, it should be appreciated that the disclosed method 500 may be implemented using any other suitable wind power generation system that is configured to supply power, including reactive power, for application to a load, such as a power grid. In addition, although FIG. 8 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown at (502), the method 500 starts. As shown at (504), the method 500 includes monitoring an active power output of the wind farm 175 and comparing the active power output to a power threshold (e.g. $P_{lim}$). For example, in one embodiment, the power threshold may be equal to or lower than 10% of rated power, which is generally the threshold above which rotor voltage is non-limiting.

As shown at (530) and (532), if the active power output of the wind farm 175 is above the power threshold, the farm-level controller 190 may relinquish control of the speed management algorithm of the present disclosure and the algorithm ends. In other words, if the active power output of the wind farm 175 is above the power threshold, the farm-level controller 190 may prohibit the wind turbines from cutting-in at the lowest possible cut-in rotor speed. In such embodiments, when the active power output has increased beyond the power threshold, the farm-level controller 190 may include operating the individual wind turbines of the wind farm 175 according to one or more standard power curves.

However, when the active power output is equal to or below the power threshold, as shown at (506), the method 500 includes calculating a reactive power requirement Q of the wind farm 175 at the point of interconnection 181. Further, as shown at (508), the calculation at (506) may be based on the active power output and an active power-reactive power (P-Q) curve specified by the power grid. As shown at (510), the method 500 may further includes calculating a reactive power availability at the point of interconnection 181 of the wind farm 175 based on the turbine availability and BoP (Balance of Plant) losses. More specifically, as shown at (512), the calculation at (510) may be completed using a database of turbine Q availability for each speed (RPM) (e.g. the maximum over-excited reactive power availability of each wind turbine for the range of speeds from minimum cut-in speed (rpm) to the rpm at which rotor voltage no longer limits reactive power availability). Alternatively or in addition, as shown at (514), the calculation at (510) may be completed using a learned database of ΔQ and ΔV (i.e. a gain/loss in reactive power and/or a voltage drop). More specifically, in an embodiment, during commissioning of the wind farm 175, the farm-level controller 190 can be walked through a set of Q and V values at low power which allows the farm-level controller 190 to learn how to account for BoP loss and translate turbine terminal quantities to POI quantities.

Still referring to FIG. 8, as shown at (516), the method 500 includes comparing the reactive power availability and the reactive power requirement so as to determine whether the available reactive power is greater than the reactive power requirement. If not, as shown at (518), the farm-level controller 190 may direct all of the wind turbines to increase their speed by a step increase (e.g. by about 15%) and then the method 500 will start over at (504). Alternatively, if the available reactive power is greater than the reactive power requirement, as shown at (520), the method 500 is configured to determine whether all of the wind turbines in the wind farm 175 with a wind speed above a cut-in wind speed threshold have begun to generate power. If not, as shown (522), the method 500 includes allowing the next wind turbine (or one or more wind turbines) to cut-in at the lowest possible cut-in speed and then starts over at (504).

Alternatively, if all of the wind turbines in the wind farm 175 with a wind speed above the cut-in wind speed threshold have begun to generate power, as shown at (524), the method 500 is configured to determine whether a power coefficient ($C_P$) of any of the wind turbines will improve with a step decrease (e.g. of about 1%) in speed. More specifically, as shown at (526), the farm-level controller 190 may determine whether the $C_P$ of any of the wind turbines will improve with a step decrease in speed based on a look-up table that relates turbine speeds with their respective power coefficients.

If the $C_P$ of any of the wind turbines will improve with a step decrease in speed, as shown at (528), then the method 500 is configured to direct or command those wind turbines to reduce their speed (RPM) by the step decrease. The method 500 then starts over at (504).

Various aspects and embodiments of the present invention are defined by the following numbered clauses:

Clause 1. A method for operating a wind farm connected to a power grid that demands a reactive power requirement that varies with active power, the wind farm having a plurality of wind turbines each including a generator coupled to a power converter, the method comprising:
monitoring a wind speed at each of the plurality of wind turbines in the wind farm;
when the wind speed is within a cut-in wind speed range, determining, via a controller of the wind farm, a reactive power margin of the wind farm based on the reactive power requirement at an active power output corresponding to the wind speed and a reactive power availability of each of the plurality of wind turbines at the wind speed;
determining, via the controller, a lowest possible cut-in rotor speed for each of the plurality of wind turbines that satisfies the reactive power margin; and,
commanding, via the controller, each of the plurality of wind turbines to cut-in and begin to produce power at the lowest possible cut-in rotor speed that satisfies the reactive power margin.

Clause 2. The method of Clause 1, wherein the cut-in wind speed range comprises wind speeds up to about 5 meters/second (m/s).

Clause 3. The method of Clauses 1 or 2, wherein determining, via the controller of the wind farm, the reactive power margin of the wind farm based on the reactive power requirement at the active power output corresponding to the wind speed and the reactive power availability of each of the plurality of wind turbines at the wind speed further comprises:
determining a difference between the reactive power requirement and a sum of the reactive power availability of each of the plurality of wind turbines; and,
determining the lowest possible cut-in rotor speed for each of the plurality of wind turbines based on the difference.

Clause 4. The method of Clause 3, further comprising storing the reactive power availability of each of the plurality of wind turbines at different cut-in wind speeds in the controller.

Clause 5. The method of Clause 3, further comprising dynamically sending, via each of the plurality of wind turbines, the reactive power availability of each of the plurality of wind turbines at different cut-in wind speeds in real-time to the controller.

Clause 6. The method of any of the preceding clauses, further comprising determining the lowest possible cut-in rotor speed for each of the plurality of wind turbines that satisfies the reactive power margin in real-time.

Clause 7. The method of Clause 1, further comprising, when the active power value has increased beyond about 10% of rated power, operating each of the plurality of wind turbines in the wind farm according to its respective standard power-speed curve.

Clause 8. The method of any of the preceding clauses, further comprising:
during a training period of the wind farm,
operating, via the controller, the wind farm at different reactive power set points and voltage set points;
determining, via the controller, a voltage drop and a change in the reactive power between terminals of each the plurality of wind turbines and a point of interconnection of the wind farm;
translating, via the controller, the voltage drop and the change in the reactive power between terminals of each the plurality of wind turbines and the point of interconnection of the wind farm to quantities that can be compared to an equivalent circuit of a collector system of the wind farm; and,
matching, via the controller, the quantities to the equivalent circuit of the collector system of the wind farm.

Clause 9. The method of any of the preceding clauses, further comprising:
during a training period of the wind farm,
calculating, via the controller, quantities of a voltage drop and a change in the reactive power between terminals of each the plurality of wind turbines and a point of interconnection of the wind farm; and,
matching, via the controller, the quantities to an equivalent circuit of the collector system of the wind farm.

Clause 10. The method of any of the preceding clauses, further comprising:
during a training period of the wind farm,
storing, in the controller, quantities of a voltage drop and a change in the reactive power between terminals of each the plurality of wind turbines and a point of interconnection of the wind farm in a look-up table; and
matching, via the controller, the quantities to an equivalent circuit of the collector system of the wind farm.

Clause 11. The method of any of the preceding clauses, wherein the generator comprises a doubly fed induction generator (DFIG).

Clause 12. A wind farm connected to a power grid, the wind farm comprising:
a plurality of wind turbines each including a generator coupled to a power converter and a turbine controller; and,
a controller communicatively coupled to the turbine controllers, the controller configured for performing a plurality of operations, comprising:
monitoring an active power output of the wind farm;
when the active power output is equal to or below a power threshold,
calculating a reactive power requirement of the wind farm based on the power output and an active power-reactive power (P-Q) curve specified by the power grid;
calculating a reactive power availability at a point of interconnection of the wind farm;
comparing the reactive power availability and the reactive power requirement; and,
allowing one or more of the plurality of wind turbines of the wind farm to cut-in and begin to produce power at a lowest possible cut-in rotor speed when the reactive power availability is greater than the reactive power requirement.

Clause 13. The wind farm of Clause 12, wherein the plurality of operations further comprise determining whether all of the plurality of wind turbines with wind speeds above a cut-in wind speed have cut-in and if so, determining whether a power coefficient of any one of the plurality of wind turbines will improve with a step decrease in rotor speed.

Clause 14. The wind farm of Clause 13, wherein, if the power coefficient of any one of the plurality of wind turbines will improve with the step decrease in rotor speed, the plurality of operations further comprise commanding those wind turbines to reduce their speed.

Clause 15. The wind farm of Clauses 12, 13, or 14, wherein the plurality of operations further comprise determining whether all of the plurality of wind turbines with wind speeds above a cut-in wind speed have cut-in and if not, allowing at least one additional wind turbine from the plurality of wind turbines to cut-in at the lowest possible cut-in rotor speed.

Clause 16. The wind farm of Clauses 12, 13, 14, or 15, wherein the power threshold is equal to or lower than 10% of rated power.

Clause 17. The wind farm of Clause 16, wherein, when the active power output has increased beyond the power threshold, the plurality of operations further comprise operating each of the plurality of wind turbines in the wind farm according to its respective standard power-speed curve.

Clause 18. The wind farm of Clauses 12, 13, 14, 15, 16, or 17, wherein calculating the reactive power availability at the point of interconnection of the wind farm further comprises storing a reactive power availability of each of the plurality of wind turbines at different cut-in wind speeds in the controller and calculating the reactive power availability at the point of interconnection of the wind farm based on the stored reactive power availabilities of the plurality of wind turbines at different cut-in wind speeds.

Clause 19. The wind farm of Clauses 12, 13, 14, 15, 16, 17, or 18, wherein calculating the reactive power availability at the point of interconnection of the wind farm further comprises dynamically sending, via each of the plurality of wind turbines, a reactive power availability of each of the plurality of wind turbines in real-time to the controller and calculating the reactive power availability at the point of interconnection of the wind farm based on the calculated reactive power availabilities of the plurality of wind turbines at different cut-in wind speeds.

Clause 20. The wind farm of Clauses 12, 13, 14, 15, 16, 17, 18, or 19, wherein the plurality of operations further comprise:
during a training period of the wind farm,
providing quantities of a voltage drop and a change in the reactive power between terminals of each the plurality of wind turbines and a point of interconnection of the wind farm; and
matching, via the controller, the quantities to an equivalent circuit of the collector system of the wind farm.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a wind farm connected to a power grid that demands a reactive power requirement that varies with active power, the wind farm having a plurality of wind turbines each including a generator coupled to a power converter, the method comprising:
monitoring a wind speed at each of the plurality of wind turbines in the wind farm;
when the wind speed is within a cut-in wind speed range,
determining, via a controller of the wind farm, a reactive power margin of the wind farm based on the reactive power requirement at an active power output corresponding to the wind speed and a reactive power availability of each of the plurality of wind turbines at the wind speed;
determining, via the controller, a lowest possible cut-in rotor speed for each of the plurality of wind turbines that satisfies the reactive power margin; and,
commanding, via the controller, each of the plurality of wind turbines to cut-in and begin to produce power at the lowest possible cut-in rotor speed that satisfies the reactive power margin.

2. The method of claim 1, wherein the cut-in wind speed range comprises wind speeds up to about 5 meters/second (m/s).

3. The method of claim 1, wherein determining, via the controller of the wind farm, the reactive power margin of the wind farm based on the reactive power requirement at the active power output corresponding to the wind speed and the reactive power availability of each of the plurality of wind turbines at the wind speed further comprises:
determining a difference between the reactive power requirement and a sum of the reactive power availability of each of the plurality of wind turbines; and,
determining the lowest possible cut-in rotor speed for each of the plurality of wind turbines based on the difference.

4. The method of claim 3, further comprising storing the reactive power availability of each of the plurality of wind turbines at different cut-in wind speeds in the controller.

5. The method of claim 3, further comprising dynamically sending, via each of the plurality of wind turbines, the reactive power availability of each of the plurality of wind turbines at different cut-in wind speeds in real-time to the controller.

6. The method of claim 1, further comprising determining the lowest possible cut-in rotor speed for each of the plurality of wind turbines that satisfies the reactive power margin in real-time.

7. The method of claim 1, wherein, when the active power value has increased beyond about 10% of rated power, the method further comprises operating each of the plurality of wind turbines in the wind farm according to its respective standard power-speed curve.

8. The method of claim 1, further comprising:
during a training period of the wind farm,
operating, via the controller, the wind farm at different reactive power set points and voltage set points;
determining, via the controller, a voltage drop and a change in the reactive power between terminals of each the plurality of wind turbines and a point of interconnection of the wind farm;
translating, via the controller, the voltage drop and the change in the reactive power between terminals of each the plurality of wind turbines and the point of interconnection of the wind farm to quantities that can be compared to an equivalent circuit of a collector system of the wind farm; and,
matching, via the controller, the quantities to the equivalent circuit of the collector system of the wind farm.

9. The method of claim 1, further comprising:
during a training period of the wind farm,
calculating, via the controller, quantities of a voltage drop and a change in the reactive power between terminals of each the plurality of wind turbines and a point of interconnection of the wind farm; and,
matching, via the controller, the quantities to an equivalent circuit of the collector system of the wind farm.

10. The method of claim 1, further comprising:
during a training period of the wind farm,
storing, in the controller, quantities of a voltage drop and a change in the reactive power between terminals of each the plurality of wind turbines and a point of interconnection of the wind farm in a look-up table; and
matching, via the controller, the quantities to an equivalent circuit of the collector system of the wind farm.

11. The method of claim 1, wherein the generator comprises a doubly fed induction generator (DFIG).

12. A wind farm connected to a power grid, the wind farm comprising:
a plurality of wind turbines each including a generator coupled to a power converter and a turbine controller; and,
a controller communicatively coupled to the turbine controllers, the controller configured for performing a plurality of operations, comprising:
monitoring an active power output of the wind farm;
when the active power output is equal to or below a power threshold,
calculating a reactive power requirement of the wind farm based on the active power output and an active power-reactive power (P-Q) curve specified by the power grid;
calculating a reactive power availability at a point of interconnection of the wind farm;
comparing the reactive power availability and the reactive power requirement; and,
allowing one or more of the plurality of wind turbines of the wind farm to cut-in and begin to produce power at a lowest possible cut-in rotor speed when the reactive power availability is greater than the reactive power requirement.

13. The wind farm of claim 12, wherein the plurality of operations further comprise determining whether all of the plurality of wind turbines with wind speeds above a cut-in wind speed have cut-in and if so, determining whether a power coefficient of any one of the plurality of wind turbines will improve with a step decrease in rotor speed.

14. The wind farm of claim 13, wherein, if the power coefficient of any one of the plurality of wind turbines will improve with the step decrease in rotor speed, the plurality of operations further comprise commanding those wind turbines to reduce their speed.

15. The wind farm of claim 12, wherein the plurality of operations further comprise determining whether all of the plurality of wind turbines with wind speeds above a cut-in wind speed have cut-in and if not, allowing at least one additional wind turbine from the plurality of wind turbines to cut-in at the lowest possible cut-in rotor speed.

16. The wind farm of claim 12, wherein the power threshold is equal to or lower than 10% of rated power.

17. The wind farm of claim 16, wherein, when the active power output has increased beyond the power threshold, the plurality of operations further comprise operating each of the plurality of wind turbines in the wind farm according to its respective standard power-speed curve.

18. The wind farm of claim 14, wherein calculating the reactive power availability at the point of interconnection of the wind farm further comprises storing a reactive power availability of each of the plurality of wind turbines at different cut-in wind speeds in the controller and calculating the reactive power availability at the point of interconnection of the wind farm based on the stored reactive power availabilities of the plurality of wind turbines at different cut-in wind speeds.

19. The wind farm of claim 12, wherein calculating the reactive power availability at the point of interconnection of the wind farm further comprises dynamically sending, via each of the plurality of wind turbines, a reactive power availability of each of the plurality of wind turbines in real-time to the controller and calculating the reactive power availability at the point of interconnection of the wind farm based on the calculated reactive power availabilities of the plurality of wind turbines at different cut-in wind speeds.

20. The wind farm of claim 12, wherein the plurality of operations further comprise:
 during a training period of the wind farm,
  providing quantities of a voltage drop and a change in the reactive power between terminals of each the plurality of wind turbines and a point of interconnection of the wind farm; and
  matching, via the controller, the quantities to an equivalent circuit of the collector system of the wind farm.

* * * * *